US011551536B2

(12) United States Patent
Suzuki

(10) Patent No.: US 11,551,536 B2
(45) Date of Patent: Jan. 10, 2023

(54) SERVER DEVICE AND BAGGAGE CHECKING METHOD

(71) Applicant: TOYOTA JIDOSHA KABUSHIKI KAISHA, Toyota (JP)

(72) Inventor: Koichi Suzuki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 167 days.

(21) Appl. No.: 16/512,459

(22) Filed: Jul. 16, 2019

(65) Prior Publication Data
US 2020/0082705 A1 Mar. 12, 2020

(30) Foreign Application Priority Data

Sep. 7, 2018 (JP) .............................. JP2018-168285

(51) Int. Cl.
G06Q 10/08 (2012.01)
G06Q 10/10 (2012.01)
G08B 21/24 (2006.01)

(52) U.S. Cl.
CPC ......... G08B 21/24 (2013.01); G06Q 10/1093 (2013.01)

(58) Field of Classification Search
CPC ............................... G06Q 10/08; G06Q 10/10
USPC ........................................................ 705/7.18
See application file for complete search history.

(56) References Cited

U.S. PATENT DOCUMENTS

| 2003/0189094 | A1* | 10/2003 | Trabitz | ................... | G06Q 10/08 235/385 |
| 2004/0098276 | A1* | 5/2004 | Blazey | ................... | G06Q 10/08 235/376 |
| 2004/0249500 | A1* | 12/2004 | Mateer | ................... | G06Q 10/02 700/225 |
| 2005/0258231 | A1* | 11/2005 | Wiater | ................. | G06Q 10/087 235/375 |
| 2015/0029024 | A1* | 1/2015 | Outwater | ........... | G08B 21/0286 340/539.13 |
| 2016/0042316 | A1* | 2/2016 | Gates | ..................... | G06Q 10/08 700/230 |
| 2016/0227897 | A1* | 8/2016 | Jobling | ................... | G09F 3/201 |

FOREIGN PATENT DOCUMENTS

| JP | 2005-284771 A | 10/2005 |
| JP | 2007-012014 A | 1/2007 |
| JP | 2014-044522 A | 3/2014 |
| JP | 2017-199119 A | 11/2017 |

* cited by examiner

Primary Examiner — Nga B Nguyen
(74) Attorney, Agent, or Firm — Oliff PLC

(57) ABSTRACT

A server device includes: an identification information storage configured to store identification information stored in identification tags; an identification information storage configured to store a baggage list where the items are listed for each activity; a schedule acquisition unit configured to acquire schedule information of the user; and a list generator configured to generate a baggage list according to an activity included in the schedule information of the user when the boarding of the user is identified. The list generator receives a plurality of schedule items that are set for a point of time after the boarding of the user is identified from the schedule acquisition unit and combines baggage lists that correspond to activities in the plurality of schedule items that have been received so as to generate a baggage list for checking in order to check whether there are enough baggage items.

12 Claims, 7 Drawing Sheets

FIG. 4

| | SATURDAY | SUNDAY |
|---|---|---|
| 6:00 | | |
| | | |
| 8:00 | | |
| | | CHECK OUT |
| 10:00 | GOLF | |
| | PLACE: A GOLF COURSE | |
| 12:00 | | |
| | 50 | SIGHTSEEING |
| 14:00 | | PLACE: C TOWN — 54 |
| | | |
| 16:00 | | |
| | | |
| 18:00 | ACCOMMODATION | RETURN HOME — 56 |
| | PLACE: B HOTEL | |
| 20:00 | | |
| | 52 | |
| 22:00 | | |
| | | |
| 0:00 | | |

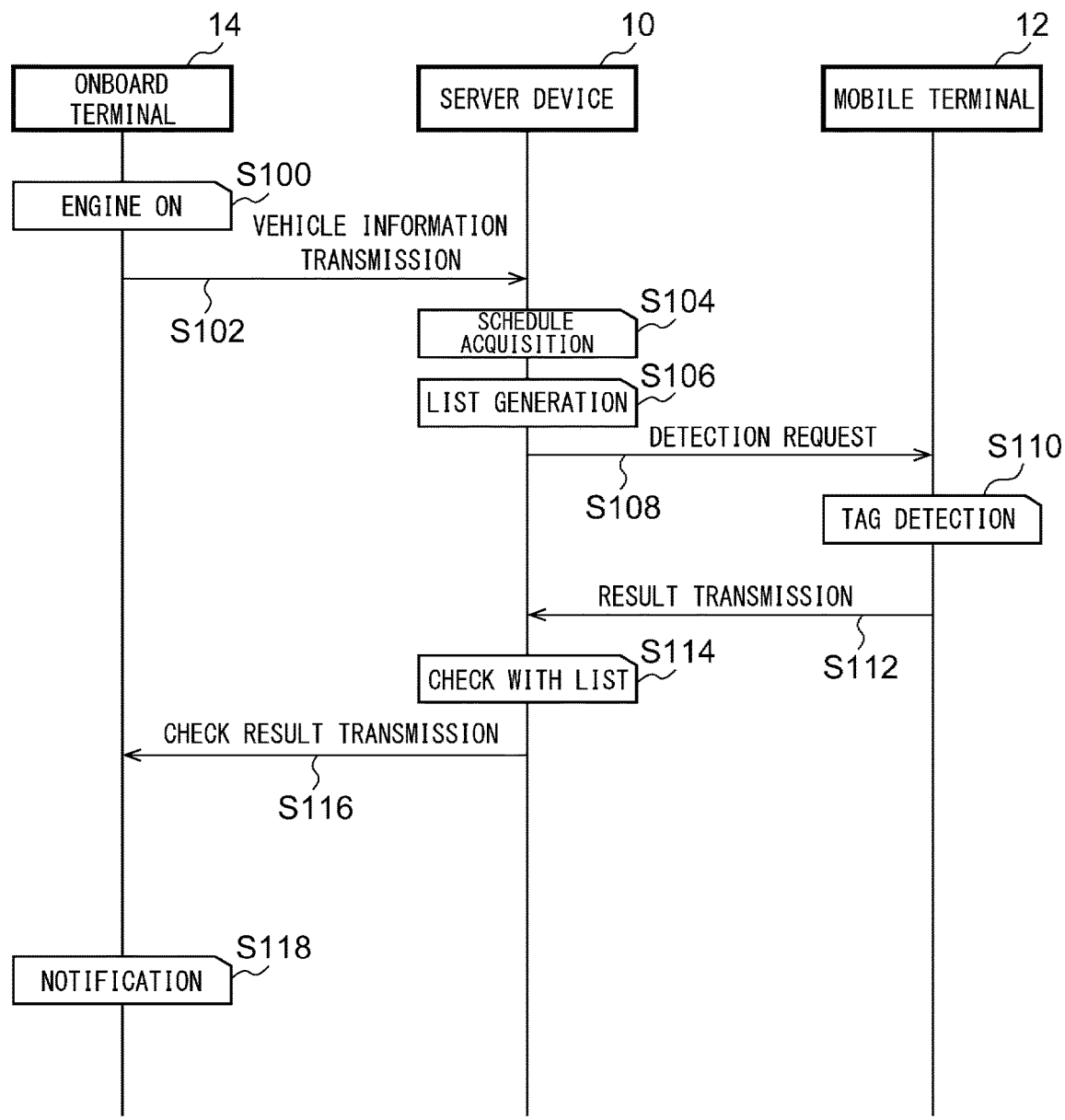

SERVER DEVICE AND BAGGAGE CHECKING METHOD

BACKGROUND

1. Technical Field

The present disclosure relates to a technology for checking whether a user getting in a vehicle has enough baggage items.

2. Background

Patent Document 1 discloses a vehicular information providing device that notifies the passenger if the passenger has forgotten to load baggage to which an IC tag is attached. This vehicular information providing device includes a setting means for setting the types of baggage items that are in a set such as skiing gear, a type detection means for reading baggage information from IC tags and detecting the types of the baggage items, and a notification means for notifying the passenger if the types of baggage items according to the destination that are set in a navigation device are lacking. For example, when the destination is set to be a ski resort in the navigation device, if any of baggage items whose types are set as skiing gear are missing, the notification means notifies the passenger accordingly.

[Patent Document 1] Japanese Patent Application Publication No. 2005-284771

The technology according to Patent Document 1 requires time and effort for input since the types of baggage items are set in one set. Further, for example, when the user's destination is a ski resort, if another sightseeing place is set in the navigation device before going to the ski resort, the determination of whether the types of baggage items are lacking will be inaccurate.

SUMMARY

A purpose of the present disclosure is to provide a technology that allows for the checking of baggage items with high accuracy with regard to user's planned activities.

A server device according to one embodiment of the present disclosure includes: an identification information storage configured to store identification information stored in identification tags attached to a plurality of items of a user; an identification information storage configured to store a baggage list where the items are listed for each activity; a schedule acquisition unit configured to acquire schedule information of the user; and a list generator configured to generate a baggage list according to an activity in a schedule item included in the schedule information of the user when the boarding of the user is identified. The list generator receives a plurality of schedule items that are set for a point of time after the boarding of the user is identified from the schedule acquisition unit and combines baggage lists that correspond to activities in the plurality of schedule items that have been received so as to generate a baggage list for checking in order to check whether there are enough baggage items.

Another embodiment of the present disclosure relates to a baggage checking method. This method includes: storing identification information stored in identification tags attached to a plurality of items of a user; storing a baggage list while the items are listed for each activity; acquiring schedule information of the user; and generating a baggage list according to an activity included in the schedule information of the user when the boarding of the user is identified. In the generating of the baggage list, a plurality of schedule items that are set for a point of time after the boarding of the user is identified are received, and baggage lists that correspond to activities in the plurality of schedule items that have been received are combined so as to generate a baggage list for checking in order to check whether there are enough baggage items.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a diagram showing schedule information of the user;

FIG. 7 is a diagram for explaining a flow for checking baggage according to an exemplary variation.

DETAILED DESCRIPTION

The disclosure will now be described by reference to the preferred embodiments. This does not intend to limit the scope of the present disclosure, but to exemplify the disclosure.

Figure 1:
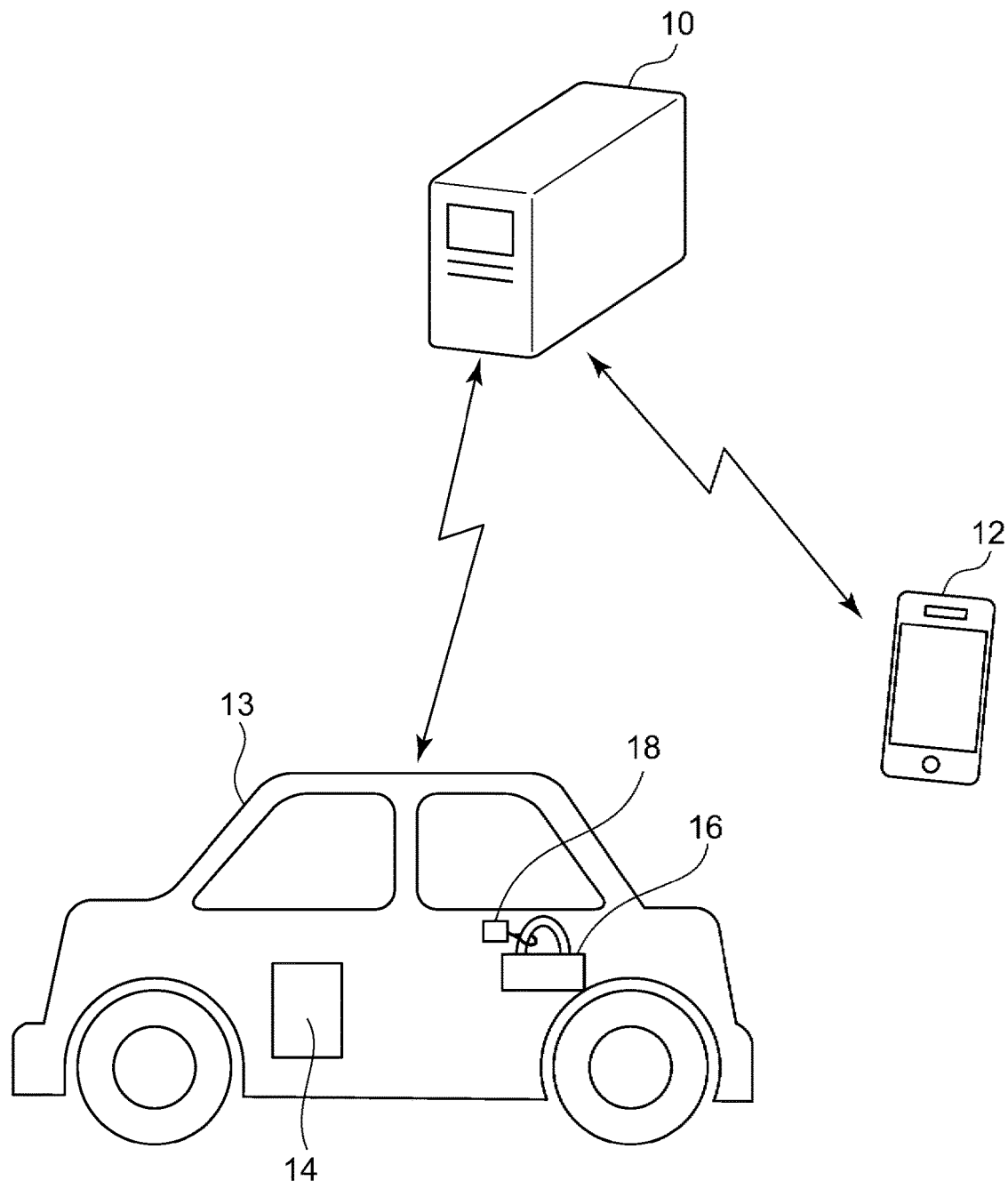
FIG. 1 is a diagram for explaining a baggage checking system according to an embodiment.

FIG. 1 is a diagram for explaining a baggage checking system 1 according to an embodiment. The baggage checking system 1 is capable of checking whether a baggage item 16, such as a bag, of the user is missing when the user gets in a vehicle 13 and after the user gets out of the vehicle. The baggage checking system 1 includes an identification tag 18 attached to the baggage item 16, a mobile terminal 12 of the user, an onboard terminal 14 mounted on the vehicle 13, and a server device 10 connected to the mobile terminal 12 and the onboard terminal 14 via a network.

The onboard terminal 14 transmits, to the server device 10, information for identifying the user's getting in or out of the vehicle 13. The information for identifying the user's getting in or out of the vehicle 13 may be engine on/off information, that is, on/off information for an on-vehicle power source, door lock information indicating that a vehicle door has been locked or unlocked while the on-vehicle power source is off, or the like. The onboard terminal 14 also transmits the terminal ID of the onboard terminal 14 when transmitting the information to the server device 10.

The user's baggage item 16 is an item possessed by the user and is an item expected by the server device 10 to be carried according to the schedule information of the user. The identification tag 18 attached to the baggage item 16 stores individual identification information and is capable of performing short-range wireless communication within several meters. The user attaches the identification tag 18 to the item the user possesses and registers in the server device 10 the identification information of the identification tag 18 and attribute information of the item the user possesses in association with each other via the mobile terminal 12. The attribute information of the item may be the type or name of the baggage item 16 or may be information for identifying the item such as "umbrella", "bag", "camera", "golf club", or the like. The mobile terminal 12 can communicate with the identification tag 18 and can detect the identification tag 18 located within several meters from the mobile terminal 12.

Figure 2:
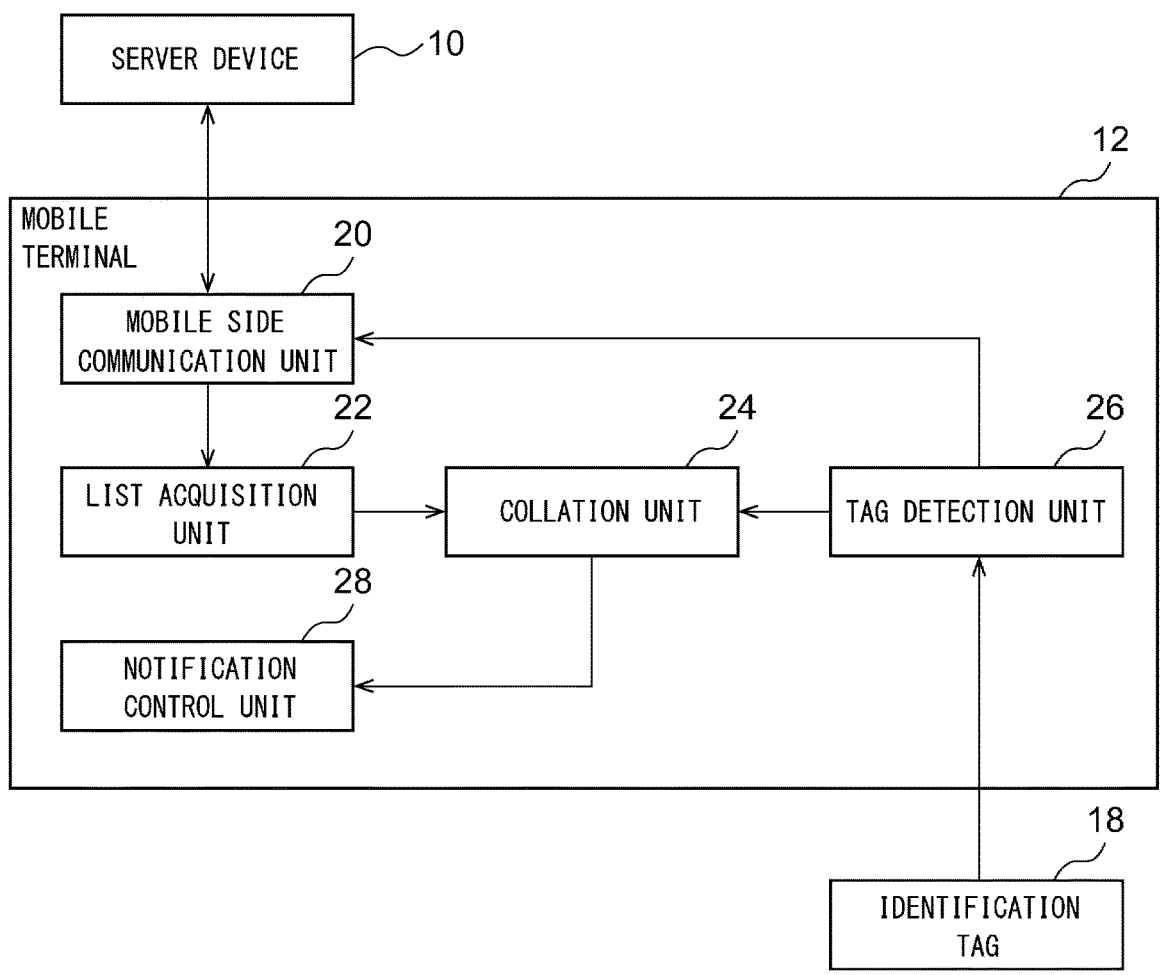
FIG. 2 is a diagram for explaining the functional configuration of a mobile terminal.
Figure 3:
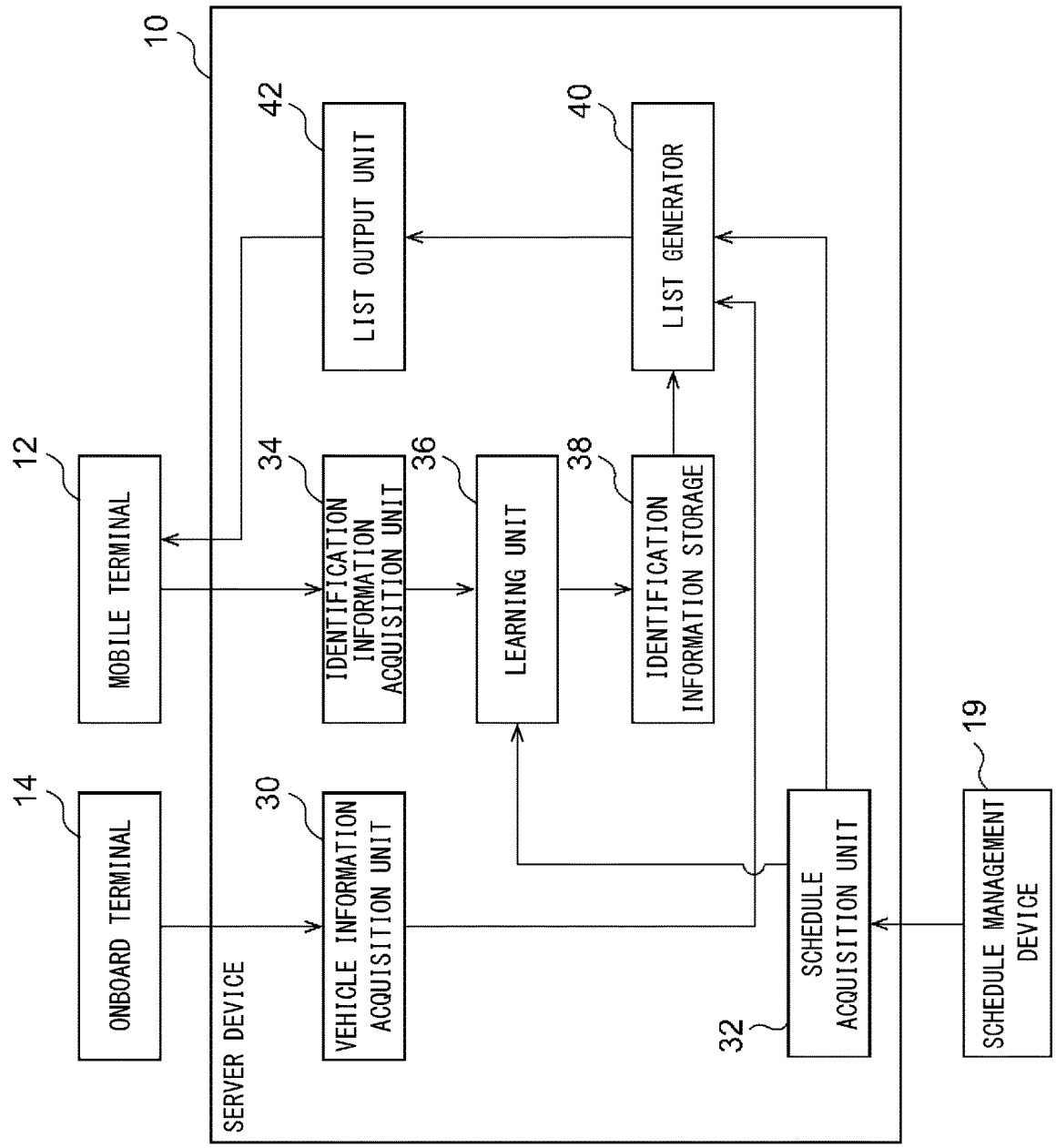
FIG. 3 is a diagram for explaining the functional configuration of a server device.

FIG. 2 is a diagram for explaining the functional configuration of the mobile terminal 12. In FIG. 2 and FIG. 3 described later, the elements shown in functional blocks that indicate a variety of processes are implemented in hardware by a circuit block, a memory, other LSI's, or the like, and in software by a program loaded in a memory, etc. Therefore, it will be obvious to those skilled in the art that the functional blocks may be implemented in a variety of manners by a combination of hardware and software.

The mobile terminal 12 includes a mobile side communication unit 20, a list acquisition unit 22, a collation unit 24, a tag detection unit 26, and a notification control unit 28. The mobile side communication unit 20 can communicate with the server device 10 via a network. When transmitting information to the server device 10, the mobile side communication unit 20 also transmits the terminal ID of the mobile terminal 12.

The tag detection unit 26 can communicate with an identification tag 18 and receives identification information from the identification tag 18. Identification information in a group of identification tags 18 that is detected at a predetermined timing by the tag detection unit 26 is transmitted to the collation unit 24 and also transmitted to the server device 10 via the mobile side communication unit 20. The list acquisition unit 22 acquires a baggage list for checking from the server device 10 via the mobile side communication unit 20. The list acquisition unit 22 acquires the baggage list for checking from the server device 10 at the timing when the user gets in or out. The baggage list has identification information for one or more baggage items 16 and attribute information thereof. Being triggered by the acquisition of the baggage list for checking from the server device 10 performed by the list acquisition unit 22, the tag detection unit 26 detects the identification tags 18.

The collation unit 24 checks whether the identification information in the group of identification tags 18 detected by the tag detection unit 26 is lacking compared to the identification information of the baggage item 16 included in the baggage list. In other words, the collation unit 24 checks whether all the identification information included in the baggage list is included in the identification information in the group of identification tags 18 detected by the tag detection unit 26. When indicating that the identification tags 18 detected by the tag detection unit 26 are lacking compared to those in the baggage list, the collation unit 24 transmits attribute information of a missing baggage item 16 to the notification control unit 28.

If an identification tag 18 is missing when checked by the collation unit 24, the notification control unit 28 performs control for notifying the user of the attribute information of a baggage item 16 that corresponds to the identification tag 18. The notification control unit 28 notifies the user by any method such as alert and text display, push notification, or voice notification. Further, the notification control unit 28 may display choices for checking the user whether the baggage item 16 corresponding to the missing identification tag 18 is necessary in accordance with the notification of a shortage and may transmit the selection result to the server device 10 for feedback.

FIG. 3 is a diagram for explaining the functional configuration of the server device 10. The server device 10 includes a vehicle information acquisition unit 30, a schedule acquisition unit 32, an identification information acquisition unit 34, a learning unit 36, an identification information storage 38, a list generator 40, and a list output unit 42. The server device 10 can be connected to a schedule management device 19 via a network. The server device 10 manages the respective terminal IDs of the mobile terminal 12 and the onboard terminal 14 in association with each other.

The vehicle information acquisition unit 30 acquires vehicle information from the onboard terminal 14. The vehicle information includes information for identifying the user's getting in/out, position information of the vehicle, time information, and the like. When the vehicle information acquisition unit 30 acquires the vehicle information and specifies the user's getting in/out, the vehicle information acquisition unit 30 may transmit an instruction signal for causing the mobile terminal 12 to detect an identification tag 18.

The schedule acquisition unit 32 acquires schedule information of the user associated with the terminal ID of the mobile terminal 12 from the schedule management device 19. The schedule acquisition unit 32 may acquire the schedule information from the mobile terminal 12. The schedule information includes a schedule item in which a subject, a destination, and a time are set, and the schedule item indicates an activity scheduled by the user. The activity included in the schedule information may be, for example, merely a destination or may be an activity of the user predicted by the subject and the destination.

The identification information acquisition unit 34 acquires the identification information in the group of identification tags 18 detected by the mobile terminal 12 when the user gets in or out of the vehicle 13. The identification information in the group of identification tags 18 is stored in the identification information storage 38 in association with an activity in a schedule item scheduled thereafter.

The learning unit 36 generates the optimal baggage list according to the activity in the schedule item based on the identification information in the group of identification tags 18 acquired by the identification information acquisition unit 34 and on the schedule item associated with the identification information. The learning unit 36 accumulates the identification information in the group of identification tags that has been detected in association with an activity in the schedule item and generates a baggage list for each activity based on the identification information and the activity in the schedule item that have been accumulated.

The generation of a baggage list based on the history of identification information in a group of identification tags 18 for each activity by the learning unit 36 allows for the listing of items carried highly frequently at the time of conducting an activity in a schedule item. The learning unit 36 learns, for example, on a weekly basis and generates the optimal baggage list for each activity. For example, when the activity indicates golf, a baggage list for golf shoes, a golf bag, etc., is generated, and when the activity indicates a training gym, a baggage list for training shoes, training equipment, etc., is generated. Further, since a baggage list is automatically generated without the user creating a baggage list for each activity, the time and effort of the user can be saved.

The identification information storage 38 stores identification information stored in an identification tag 18 registered by the user in advance and stores the identification information in the identification tag 18 in association with an activity and detection date and time in a schedule item. In other words, the identification information storage 38 stores identification information in the group of identification tags 18 detected by the mobile terminal 12 in association with a schedule item. Further, the identification information storage 38 stores a baggage list for each activity generated by the learning unit 36.

At the time when the getting in/out of the user is identified by the vehicle information acquisition unit 30, the list generator 40 generates a baggage list that corresponds to the destination according to schedule information for a schedule set after that time. If a plurality of schedule items set for a point of time after the user's getting in/out of the vehicle is identified are acquired, the list generator 40 combines baggage lists that correspond to the activities in the plurality of schedule items that have been acquired and generates a baggage list for checking in order to check whether there are enough baggage items. When the user gets in a vehicle and is planning a plurality of activities, this allows for the checking of a baggage item for each of the plurality of activities. Here, an explanation will be given regarding schedule items when the list generator 40 combines baggage lists.

FIG. 4 shows schedule information of the user. Schedule information for two days shown in FIG. 4 includes a plurality of schedule items. In a first schedule item 50, a subject "golf", a place which is a destination, and time are set. In a second schedule item 52, a subject "accommodation", a destination, and time are set. In a third schedule item 54, a subject "sightseeing", a destination, and time are set. In a forth schedule item 56, a subject and time are set. A baggage list according to the activity in the first schedule item 50 includes golf equipment. A baggage list according to the activity in the second schedule item 52 includes goods for an overnight stay. A baggage list according to the activity in the third schedule item 54 includes a camera and a small bag.

When the user gets in a vehicle from home at 9:00 am on Saturday, the list generator 40 generates a baggage list based on the schedule information. On the assumption that the activities in the first schedule item 50, the second schedule item 52, and the third schedule item 54 are ongoing until the user goes back home, the list generator 40 generates a baggage list for checking by combining the baggage lists that correspond to the activities in the first schedule item 50, the second schedule item 52, and the third schedule item 54 based on the plurality of schedule items 50, 52, 54, and 56. This allows the user to receive a baggage list that corresponds to the activities in the schedule at the time of the boarding into a vehicle, and the user can thereby check whether there are any items that are left behind for each activity. Further, when it is predicted that the schedule items are continuous, combining the baggage lists allows for accurate checking to see if there are any items that are left behind for a plurality of activities.

Based on the distance between the respective destinations set for adjacent schedule items and/or the interval between the times set for the adjacent schedule items, the list generator 40 predicts whether the schedule items are continuous. For example, if the distance between the destinations set for the adjacent schedule items is equal to or less than a predetermined distance and/or the gap time between the adjacent schedule items is equal to or less than a predetermined time, the list generator 40 determines that the schedule items are continuous. Also, the list generator 40 may predict whether the schedule items are continuous depending on whether the user can return home during the gap time between the adjacent schedule items. The list generator 40 determines that the schedule items are continuous if returning home during the gap time is set to be impossible.

When the boarding of the user is identified, the list generator 40 generates a baggage list for checking where baggage lists that correspond to activities in a plurality of schedule items set within the time from when the vehicle leaves a reference position to when the vehicle returns to the reference position are combined. The reference position is, for example, the user's home. In other words, if a plurality of schedule items are set for the time from when the user leaves home to when the user returns home, the list generator 40 combines baggage lists that correspond to the activities in these schedule items so as to generate a list for checking. This allows the user to check whether there are any items left behind before the user returns to the reference position such as home. The reference position may be able to be set by the user through the mobile terminal 12, or the learning unit 36 may acquire position information from the onboard terminal 14 so as to identify the home and set the home as the reference position.

The fact that the user has gotten in a vehicle from home can be identified based on the position information of the vehicle at the time when the user gets in the vehicle or the position information of the mobile terminal. When the user will return home is identified based on the schedule information at the time when the user gets in a vehicle. For example, when a special schedule item such as a schedule item indicating an overnight stay is not scheduled when the user gets in a vehicle or when an activity of returning home is set in a schedule item, the user is identified to return home at a predetermined time such as night time. Further, the list generator 40 may predict whether the user will return home based on the distance between the destinations set for adjacent schedule items and the interval of the gap between the adjacent schedule items.

When there is a schedule item indicating an overnight stay, the list generator 40 generates a baggage list for checking in which baggage lists that correspond to activities in schedule items before and after the overnight stay are combined. The second schedule item 52 in FIG. 4 indicates an overnight stay, and, on the assumption that the first schedule item 50 and the third schedule item 54 before and after the second schedule item 52 are schedule items that are ongoing until the user returns home, the list generator 40 generates a new list by combining baggage lists for the schedule items at the time of the boarding at 9 a.m. on Saturday. As described, it is possible to clearly know that the user is not scheduled to return home and to check whether there is any item that is left behind for the activity planned after the overnight stay. The baggage list for checking is generated by combining the baggage lists that correspond to the series of schedule items expected after the user leaves home and before the user returns home.

The list generator 40 may adjust the baggage list based on weather information and the user's past history that have been acquired and may add rain gear as a baggage item if the weather is rainy. As described above, the list generator 40 may adjust the baggage list for checking based on the weather information.

FIG. 3 is now referred back. The list output unit 42 outputs, to the mobile terminal 12, the baggage list for checking generated by the list generator 40. Thereby, the mobile terminal 12 can check a baggage item 16 included in the baggage list for checking with an identification tag 18 that has been detected.

Figure 5:
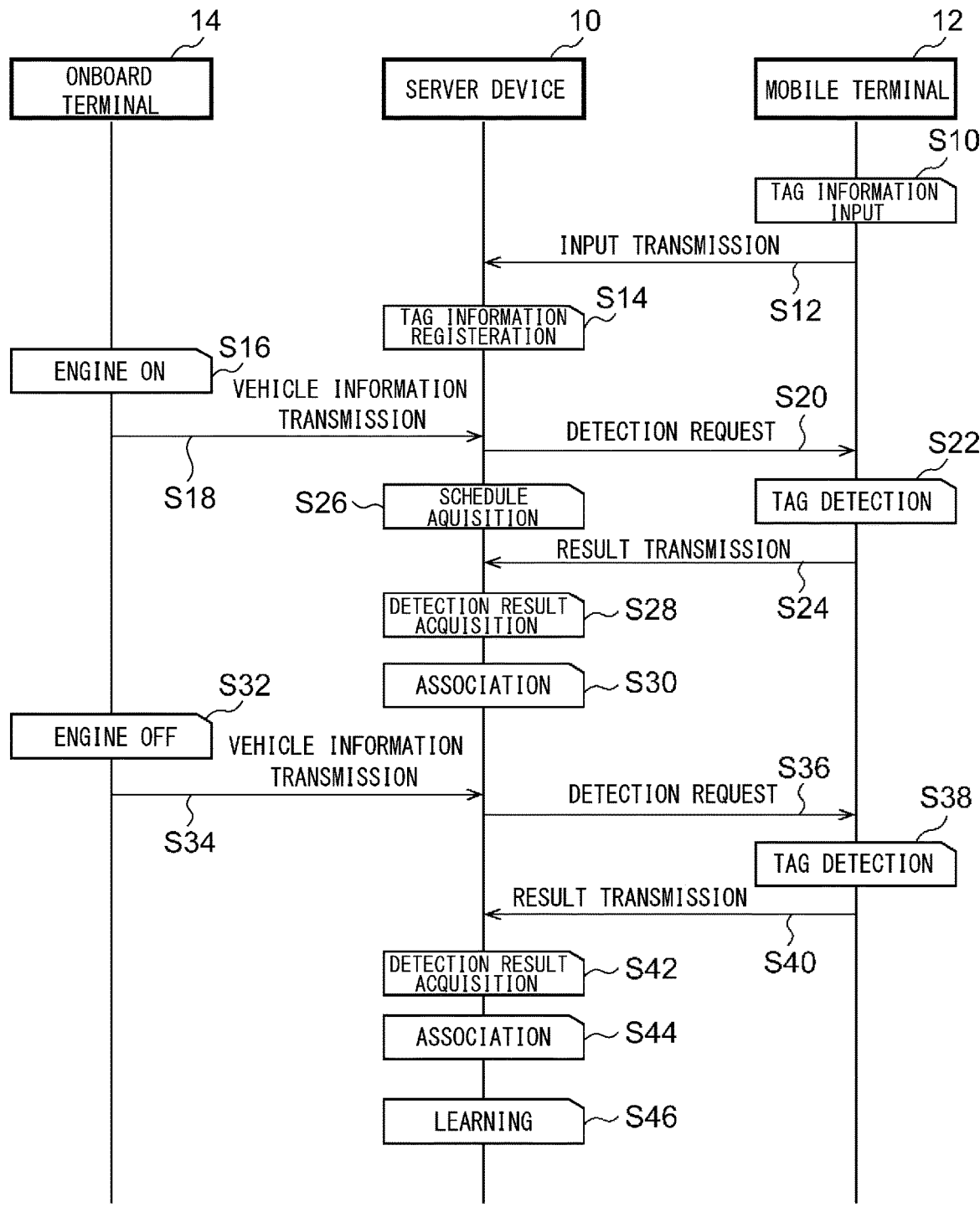
FIG. 5 is a diagram for explaining a flow for learning a baggage list for each destination.

FIG. 5 is a diagram for explaining a flow for learning a baggage list for each destination. The user enters information of an identification tag 18 attached to an item through the mobile terminal 12 (S10) such that the information is transmitted to the server device 10 (S12). The server device 10 registers the type and identification information of the item as the information of the identification tag 18 (S14). Thereby, the initial registration of the identification tag 18 is completed.

The onboard terminal 14 detects the boarding of the user who has turned on the engine (S16) and transmits vehicle information to the server device 10 (S18).

The server device 10 specifies the user's boarding the acquisition of the vehicle information and transmits a signal requesting the detection of the identification tags 18 to the mobile terminal 12 (S20). The mobile terminal 12 detects identification tags 18 located within several meters by short-range wireless communication (S22) and transmits identification information in a group of identification tags 18 that has been detected to the server device 10 as a detection result (S24). This allows for the detection of baggage items loaded in the vehicle.

The server device 10 acquires schedule information from the schedule management device 19 (S26), acquires the detection result of the identification tags 18 from the mobile terminal 12 (S28), and stores the identification information in the group of identification tag 18 in association with schedule items (S30). The identification information in the group of identification tags 18 that has been detected may be stored in association with a plurality of schedule items.

The onboard terminal 14 detects the getting-out of the user who has turned off the engine (S32) and also transmits vehicle information to the server device 10 (S34). The server device 10 specifies the user's getting-out through the acquisition of the vehicle information and transmits a signal requesting the detection of the identification tags 18 to the mobile terminal 12 after a predetermined period of time (S36). The mobile terminal 12 detects identification tags 18 located within several meters by short-range wireless communication (S38) and transmits identification information in a group of identification tags 18 that has been detected to the server device 10 as a detection result (S40). Thereby, the user can detect a baggage item at a position away from the vehicle after getting out.

The server device 10 acquires the detection result of the identification tag 18 from the mobile terminal (S42) and stores the identification information in the group of identification tags 18 in association with schedule items (S44). As described, the identification information in an identification tag 18 attached to an item carried by the user at the time of getting in or out can be stored. The learning unit 36 generates a baggage list for each activity based on the accumulated identification information in the group of the identification tags 18 and on the activities in the schedule items associated with the identification information (S46). As described above, a baggage list for each activity can be generated when the user gets in or out of the vehicle.

Figure 6:
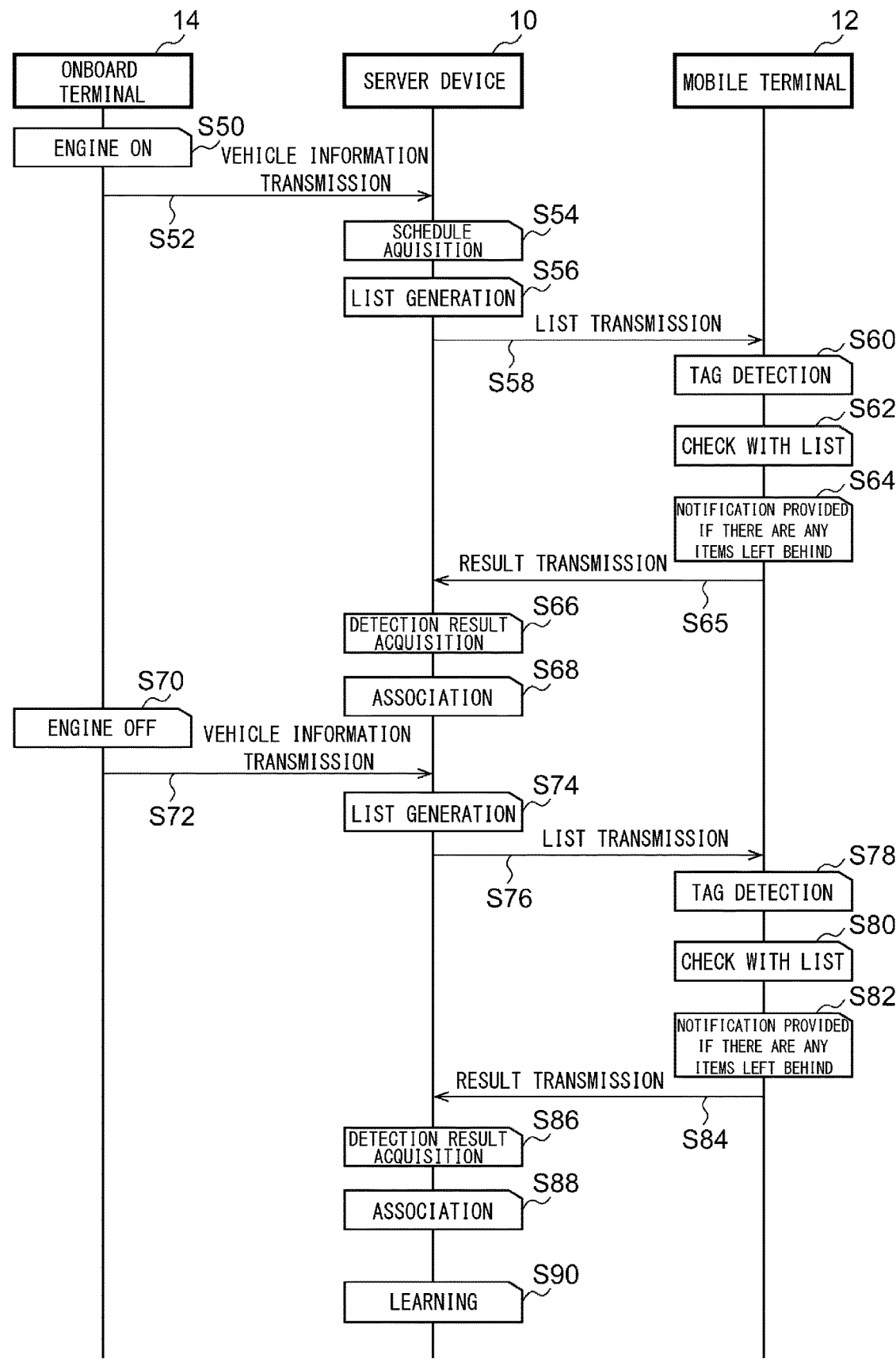
FIG. 6 is a diagram for explaining a flow for checking baggage.

FIG. 6 is a diagram for explaining a flow for checking baggage. The onboard terminal 14 detects the boarding of the user who has turned on the engine (S50) and transmits vehicle information to the server device 10 (S52). The server device 10 specifies the user's boarding through the acquisition of the vehicle information, acquires schedule information from the schedule management device 19 (S54), generates a baggage list for checking that corresponds to activities in schedule items expected after the boarding (S56), and transmits the baggage list for checking to the mobile terminal 12 (S58).

The mobile terminal 12 detects identification tags 18 located within several meters by short-range wireless communication (S60) and checks the baggage list for checking with a group of identification tags 18 that has been detected so as to check whether the identification tags are lacking compared to the baggage list (S62). The mobile terminal 12 notifies the user that there is an item that has been left behind when the group of identification tags 18 that has been detected is lacking compared to baggage items included in the baggage list (S64). Thereby, the user can check baggage items for the future activity plan. The mobile terminal 12 transmits the detection result of the identification tags 18 to the server device 10 (S65).

The server device 10 acquires the detection result of the identification tags 18 (S66) and stores the detection result of the identification tags 18 in association with the schedule items (S68).

The onboard terminal 14 detects the getting-out of the user who has turned off the engine (S70) and also transmits vehicle information to the server device 10 (S72). The server device 10 specifies the user's boarding through the acquisition of the vehicle information, generates a baggage list for checking that corresponds to activities in schedule items expected after the boarding (S74), and transmits the baggage list for checking to the mobile terminal 12 (S76).

The mobile terminal 12 detects identification tags 18 (S78) and checks the baggage list for checking with a group of identification tags 18 that has been detected so as to check whether the identification tags are lacking compared to the baggage list (S80). The mobile terminal 12 notifies the user that there is an item that has been left behind when the group of identification tags 18 that has been detected is lacking compared to baggage items included in the baggage list (S82). Thereby, the user can check baggage items for the future activity plan and can check to see if there are any items that have been left behind in the vehicle. The mobile terminal 12 transmits the detection result of the identification tags 18 to the server device 10 (S84).

The server device 10 acquires the detection result of the identification tags 18 (S86) and stores the detection result of the identification tags 18 in association with the schedule items (S88). Further, the server device 10 learns based on the detection result of the identification tags 18 that has been detected and updates the baggage list (S90).

FIG. 7 is a diagram for explaining a flow for checking baggage according to an exemplary variation. A baggage checking method according to the exemplary variation is different from the baggage checking method shown in FIG. 6 in that a step of checking a baggage list with the detection result of an identification tag 18 is performed in a server device 10 and notification to the user is performed by an onboard terminal 14.

The onboard terminal 14 detects the boarding of the user who has turned on the engine (S100) and transmits vehicle information to the server device 10 (S102). The server device 10 specifies the user's boarding through the acquisition of the vehicle information, acquires schedule information of the user from a schedule management device 19 (S104), generates a baggage list for checking that corresponds to activities in schedule items expected after the boarding (S106), and transmits an instruction signal requesting the detection of an identification tag 18 to the mobile terminal 12 (S108).

The mobile terminal 12 detects identification tags 18 located within several meters by short-range wireless communication (S110), and the mobile terminal 12 transmits the detection result of the identification tags 18 to the server device 10 (S112). The server device 10 according to the exemplary variation has the feature of a collation unit and checks the group of identification tags 18 that has been detected with the baggage list for checking so as to check whether the group of identification tags 18 that has been detected are lacking compared to baggage items 16 included in the baggage list (S114).

When the group of identification tags 18 that has been detected are lacking compared to baggage items 16 included in the baggage list, the server device 10 transmits the attribute information of a baggage item that is missing to the onboard terminal 14 (S116). The onboard terminal 14 notifies the user of the attribute information of the baggage item indicating that there is an item that is left behind (S118). As described above, even when the server device 10 performs the checking with a list or the onboard terminal 14 provides the notification to the user, checking on the baggage items can be performed.

The embodiments are intended to be illustrative only, and it will be obvious to those skilled in the art that various modifications to constituting elements could be developed and that such modifications are also within the scope of the present disclosure.

In the embodiments, an embodiment has been shown where a mobile terminal 12 detects identification tags 18. However, this embodiment is non-limiting. A communication device that is capable of communicating with an identification tag 18 may be provided in a vehicle 13, and an onboard terminal 14 may acquire the detection result of an identification tag 18.

What is claimed is:

1. A server device comprising:
a memory that stores: (i) for each of a plurality of items of a user, identification information of identification tags attached to the plurality of items of the user and attribute information for each of the items, and (ii) a plurality of activity baggage lists each of which correlates one or more of the items to a specific one of a plurality of activities; and
circuitry configured to:
(a) acquire schedule information of the user in response to receipt of a signal sent by an onboard terminal of a vehicle indicating that the user has been detected to have boarded the vehicle;
(b) automatically analyze the schedule information that has been acquired in response to receipt of the signal sent by the onboard terminal of the vehicle indicating that the user has been detected to have boarded the vehicle, to identify activities within schedule items in the schedule information;
(c) based on the identified activities, access the stored activity baggage lists, and when the schedule information includes a plurality of the schedule items indicating a plurality of the activities that are set for different points of time after the boarding of the vehicle by the user, generate a checking baggage list by combining the activity baggage lists that correspond to the identified plurality of activities in the plurality of schedule items;
(d) receive a signal indicating detected identification tags within the vehicle, the signal having been generated based on an output of a sensor within the vehicle;
(e) based on the signal indicating detected identification tags within the vehicle, identify a group of items that have been loaded in the vehicle by referring to the stored identification information to determine which item corresponds to each of the detected identification tags;
(f) determine whether all of the items in the checking baggage list are present in the vehicle by comparing the group of items with the checking baggage list; and
(g) in response to a determination than an item in the checking baggage list is missing from the group of items, transmit a signal notifying the user of the vehicle of the missing item.

2. The server device according to claim 1, wherein the circuitry generates the checking baggage list by combining the activity baggage lists that correspond to the plurality of activities in the schedule items from a start time from when the vehicle leaves a reference position to a finish time when the vehicle returns to the reference position.

3. The server device according to claim 1, wherein when one of the schedule items indicates an overnight stay, the circuitry generates the checking baggage list by combining the activity baggage lists that correspond to the activities before and after the overnight stay.

4. The server device according to claim 1, wherein the circuitry is further configured to automatically generate the activity baggage lists by associating specific ones of the items identified by the identification tags detected when the user has been detected to have boarded the vehicle with specific ones of the activities, and by updating the activity baggage lists over time.

5. A baggage checking method comprising:
storing, in a memory, for each of a plurality of items of a user, identification information of identification tags attached to the plurality of items of the user and attribute information for each of the items;
storing, in the memory, a plurality of activity baggage lists each of which correlates one or more of the items to a specific one of a plurality of activities;
acquiring, by a processor, schedule information of the user in response to a signal sent by an onboard terminal of a vehicle indicating that the user has been detected to have boarded the vehicle;
the processor automatically analyzing the schedule information that has been acquired in response to the signal sent by the onboard terminal of the vehicle indicating that the user has been detected to have boarded the vehicle, to identify activities within schedule items in the schedule information;
based on the identified activities, access the stored activity baggage lists, and when the schedule information includes a plurality of the schedule items indicating a plurality of the activities that are set for different points of time after the boarding of the vehicle by the user, generating a checking baggage list by combining the activity baggage lists that correspond to the identified plurality of activities in the plurality of schedule items;
receiving, by the processor, a signal indicating detected identification tags within the vehicle, the signal having been generated based on an output of a sensor within the vehicle:
based on the signal indicating detected identification tags within the vehicle, the processor identifying a group of items that have been loaded in the vehicle by referring to the stored identification information to determine which item corresponds to each of the detected identification tags;

determining, by the processor, whether all of the items in the checking baggage list are present in the vehicle by comparing the group of items with the checking baggage list; and the processor, in response to a determination than an item in the checking baggage list is missing from the group of items, transmitting a signal notifying the user of the vehicle of the missing item.

6. The server device according to claim 2, wherein when one of the schedule items indicates an overnight stay, the circuitry generates the checking baggage list by combining the activity baggage lists that correspond to the activities before and after the overnight stay.

7. The server device according to claim 2, wherein the circuitry is further configured to automatically generate the activity baggage lists by associating specific ones of the items identified by the identification tags detected when the user has been detected to have boarded the vehicle with specific ones of the activities, and by updating the activity baggage lists over time.

8. The server device according claim 3, wherein the circuitry is further configured to automatically generate the activity baggage lists by associating specific ones of the items identified by the identification tags detected when the user has been detected to have boarded the vehicle with specific ones of the activities, and by updating the activity baggage lists over time.

9. The server device according to claim 6, wherein the circuitry is further configured to automatically generate the activity baggage lists by associating specific ones of the items identified by the identification tags detected when the user has been detected to have boarded the vehicle with specific ones of the activities, and by updating the activity baggage lists over time.

10. A baggage checking system comprising:
the server device according to claim 1; and
a mobile terminal of the user of the vehicle, wherein
the mobile terminal includes-a the sensor that detects the identification tags of items in a vicinity of the sensor, and based on an output of the sensor, outputs the signal indicating detected identification tags to the server.

11. The server device according to claim 1, wherein:
the circuitry of the server is further configured to automatically generate the activity baggage lists by:
(i) determining from an output of-a the sensor that detects the identification tags in the vehicle at a boarding time of the vehicle, the items having the identification tags that are present in the vehicle,
(ii) storing, in the memory, a list of the items that have been determined to be present in the vehicle in association with a specific one of the activities based on the acquired schedule information of the user,
(iii) determining which of the items that were present in vehicle have been removed from the vehicle based on the output of the sensor in the vehicle a predetermined time after reaching a location of the specific one of the activities, and
(iv) updating the activity baggage list in the memory for the specific one of the activities based on the results of (i) and (iii).

12. A baggage checking system comprising:
a server device;
a vehicle having an onboard terminal, the onboard terminal automatically generating a signal indicating that a user of the vehicle has been detected to have boarded the vehicle based on at least one of on/off information of an engine of the vehicle and door lock information of the vehicle; and
a mobile terminal of the user of the vehicle, wherein
the server device includes:
a memory that stores: (i) for each of a plurality of items of the user, identification information of identification tags attached to the plurality of items of the user and attribute information for each of the items, and (ii) a plurality of activity baggage lists each of which correlates one or more of the items to a specific one of a plurality of activities; and
circuitry configured to:
(a) automatically acquire schedule information of the user in response to receipt of the signal sent by the onboard terminal of the vehicle indicating that the user has been detected to have boarded the vehicle;
(b) automatically analyze the schedule information that has been acquired in response to receipt of the signal sent by the onboard terminal of the vehicle indicating that the user has been detected to have boarded the vehicle, to identify activities within schedule items in the schedule information;
(c) based on the identified activities, access the stored activity baggage lists, and when the schedule information includes a plurality of the schedule items indicating a plurality of the activities that are set for different points of time after the boarding of the vehicle by the user, generate a checking baggage list by combining the activity baggage lists that correspond to the identified plurality of activities in the plurality of schedule items; and
(d) transmit the checking baggage list to the mobile terminal of the user;
the mobile terminal of the user:
(1) includes a sensor that detects the identification tags of items in a vicinity of the sensor, and based on an output of the sensor identifies detected identification tags within the vehicle;
(2) based on the detected identification tags within the vehicle, identifies a group of items that have been loaded in the vehicle;
(3) determines whether all of the items in the checking baggage list are present in the vehicle by comparing the group of items with the checking baggage list that has been transmitted to the mobile terminal by the server; and
(4) in response to a determination than an item in the checking baggage list is missing from the group of items, notifies the user of the vehicle of the missing item.

\* \* \* \* \*